United States Patent [19]

Stroud

[11] 4,329,901

[45] May 18, 1982

[54] ELASTOMERIC STRAIN SYSTEM FOR BANDMILLS

[75] Inventor: Brian T. Stroud, Richmond, Canada

[73] Assignee: CAE Machinery Ltd., Vancouver, Canada

[21] Appl. No.: 155,738

[22] Filed: Jun. 2, 1980

[51] Int. Cl.³ .................. B23D 55/10; B27B 13/08
[52] U.S. Cl. ................................. 83/819; 83/818; 83/817
[58] Field of Search .................. 83/818, 819, 817

[56] References Cited

U.S. PATENT DOCUMENTS

| | | | |
|---|---|---|---|
| 384,252 | 6/1888 | Gillis | 83/818 |
| 544,999 | 8/1895 | Thomas | 83/818 |
| 3,838,620 | 10/1974 | Baldrey et al. | 83/819 |
| 4,094,218 | 6/1978 | Flanigan | 83/819 X |

*Primary Examiner*—Donald R. Schran
*Attorney, Agent, or Firm*—Townsend and Townsend

[57] ABSTRACT

A bandmill has a frame, first and second bandwheels for receiving and guiding a bandsaw, the bandwheels being rotatable about spaced-apart, generally parallel axes of rotation, first and second arbors of the first and second bandwheels respectively, apparatus fixedly mounting the first arbor on the frame, and a strain mechanism for the bandsaw. The strain mechanism comprises a bearing member for the second arbor and an elastomeric member compressibly supporting the bearing member.

16 Claims, 3 Drawing Figures

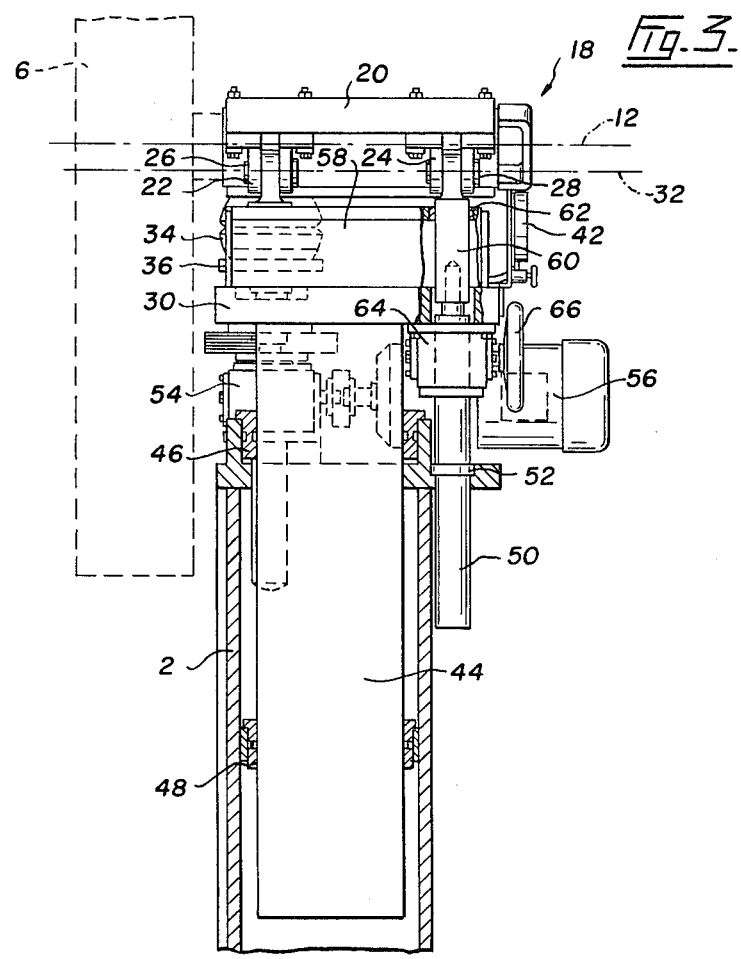

4,329,901

ELASTOMERIC STRAIN SYSTEM FOR BANDMILLS

BACKGROUND OF THE INVENTION

The invention relates to bandmills and in particular to an improved strain system for applying strain to a bandsaw received on the bandwheels of the mill.

The tendency towards reduced thickness of bandsaw blades, to give a thinner cut and minimize sawdust loss, has given rise to problems involving blade instability. As a result, various improvements have taken place in the development of bandmill strain systems. For example, U.S. Pat. No. 3,905,266 to Weavell discloses a bandmill strain system incorporating an air spring. Such a strain system responds sufficiently rapidly to shock loadings on the saw blade to overcome the instability referred to above. Further examples of strain mechanism using air springs are U.S. Pat. No. 3,810,409 to Allen and U.S. Pat. No. 3,838,620 to Baldrey.

Some disadvantages of strain systems utilizing air springs include the necessity of providing a relatively constant pressure source of air or other gases and a piping arrangement to conduct the gases to the air spring. Further, many air springs include relatively thin rubber components and any damage in these could result in failure of the strain system.

SUMMARY OF THE INVENTION

According to the invention, a bandmill has a frame, first and second bandwheels for receiving and guiding a bandsaw, the bandwheels being rotatable about spaced-apart generally parallel axes of rotation, first and second arbors for the first and second bandwheels respectively, means fixedly mounting the first arbor on the frame against movement towards and away from the second arbor, means mounting the second arbor on the frame for limited movement towards and away from the first arbor, and a strain mechanism for the bandsaw. The strain mechanism comprises a bearing member for the second arbor and an elastomeric member carried by the frame and positioned to compressibly support the bearing member.

Where the bearing member comprises a carrier arm, the elastomeric member may be compressibly received between the carrier arm and the frame and has sufficient rigidity to support the carrier arm.

When compared with strain systems utilizing air springs, a strain system utilizing the compressive support of an elastomeric member obviates the need for a source of pressurized gas and the piping between the source and the strain mechanism. Because of the removal of the gas system and the more durable nature of such elastomeric members when compared with air springs, the need for maintenance is reduced. Moreover, because an elastomeric member is capable of transmitting large forces, virtually the entire force straining the bandsaw can act through the rubber spring. This should be compared, for example, to a system such as disclosed in U.S. Pat. No. 3,838,620 to Baldrey where the hinge member must transmit most of the force.

The removal of large forces from the hinge simplifies the design and increases the life of this part of the mechanism. The present invention allows a large percentage of the strain force to be transmitted through the rubber spring, and the rocker arm serves to locate and align the arbor of one bandwheel while transmitting substantially less strain to the hinge than such arms have transmitted heretofore. When large leaks occur in the air system supplying air springs, catastrophic failure of the entire strain system is possible. This is not possible with a bandsaw strain mechanism employing an elastomeric member to compressibly support the arbor. Even where a small fluid cylinder is installed below the elastomeric member to indicate the strain and leakage occurs, the stroke of the cylinder can be completely compensated by raising a mechanical jack.

An elastomeric member provides a degree of damping not achievable using air. Hydraulic systems also provide damping, but this could vary due to poor maintenance or contamination.

Although the spring rate and damping properties of an elastomeric member will vary with the durometer hardness differences between individual members, temperature changes and age, the combined effect of all of these will be much less than the possible changes in the properties of a fluid system due to poor installation, contamination of fluid, seizure of parts, leaks and temperature changes.

Elastomeric members are considerably less susceptible to corrosion which can affect the durability and spring rate of steel springs. Unless consistently lubricated, fretting corrosion can be a problem with Belleville springs due to small motions between the discs. Given the same spring rate desired and the spring stroke, the envelope of an elastomeric member is significantly smaller than practically achievable with coil or Belleville springs. By varying the durometer hardness, the spring rate of an elastomeric member can easily be varied without affecting the dimensions. As opposed to an elastomeric member, little or no damping would be obtained with coil springs. While Belleville springs would provide some energy absorption due to friction between springs, rather than increasing with velocity (as does an ideal damper) the friction decreases with velocity since the static friction would be higher than dynamic friction.

Horizontal displacement variations caused by pivoting of the arbor support will cause the elastomeric member to shear slightly. No pivoting or sliding mechanism is therefore required at the spring end support.

BRIEF DESCRIPTION OF THE DRAWINGS

FIG. 3 is an end view, partly in section, of the strain mechanism of FIG. 2.

DESCRIPTION OF THE PREFERRED EMBODIMENTS

Figure 1:
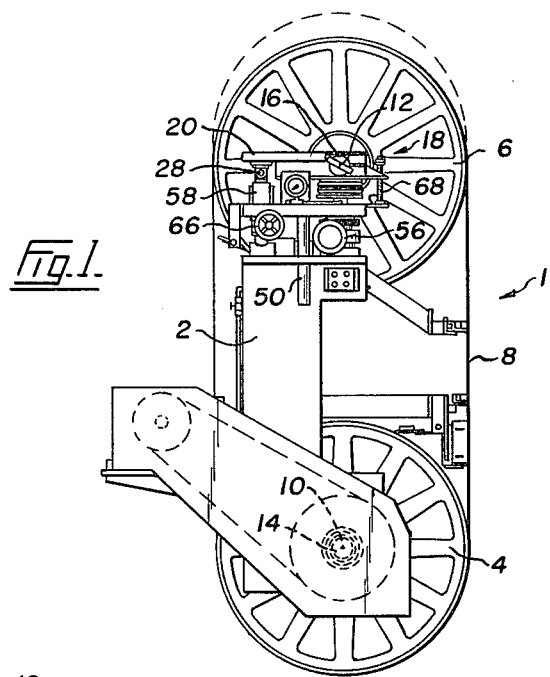
FIG. 1 is a side elevational view of a bandmill according to the invention.

Referring to FIG. 1, the bandmill 1 is generally similar in overall configuration to those already known in the industry. The bandmill has a frame 2, a first bandwheel 4 and a second bandwheel 6 for receiving and guiding a bandsaw 8. The bandwheels are rotatable about spaced-apart, generally parallel axes of rotation 10 and 12. Bandwheel 4 has an arbor 14, while bandwheel 6 has an arbor 16. Arbor 14 of bandwheel 4 is fixedly mounted on the frame 2 against movement towards and away from arbor 16.

Figure 2:
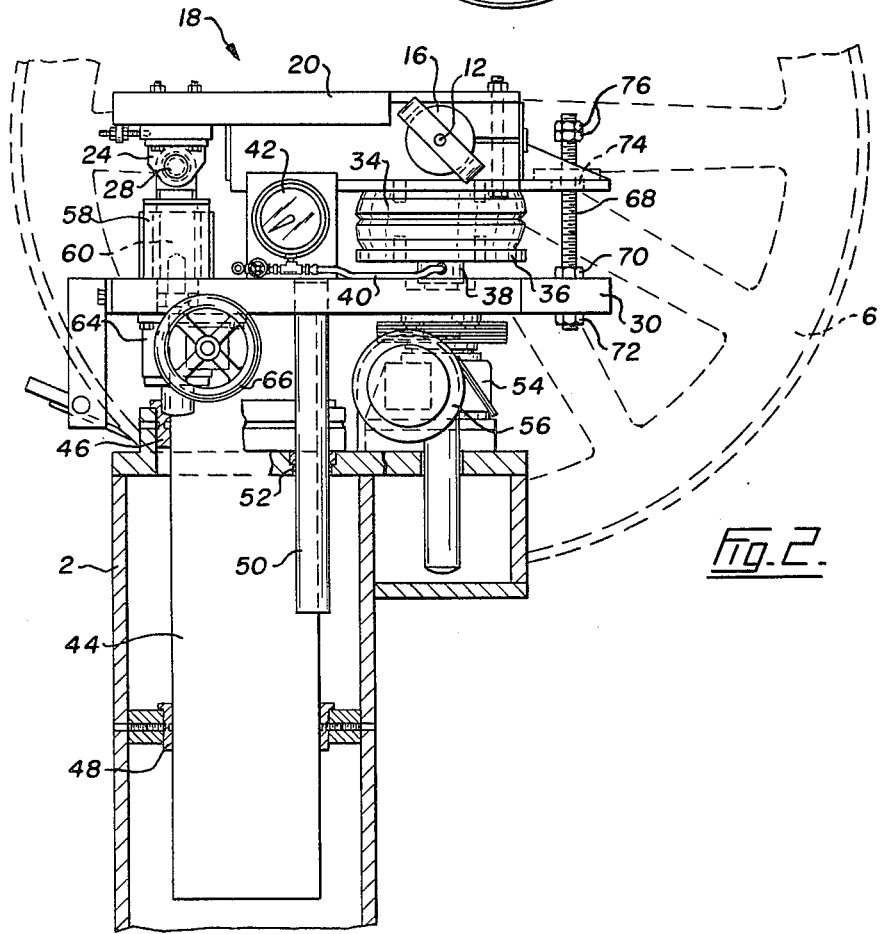
FIG. 2 is an enlarged elevational view, partly in section, of the strain mechanism for the bandmill of FIG. 1.

Bandmill 1 also includes a strain mechanism 18 for the bandsaw 8 as shown in better detail in FIGS. 2 and 3.

The strain mechanism includes a bearing member or carrier arm 20 which acts as a support for the second arbor 16. A pair of hinge members 22 and 24 including clevis pins 26 and 28 provide pivotal connections at opposite sides of carrier arm 20 between this arm and a base 30 which forms part of the general support frame of the apparatus. The first hinge member 22 is generally adjacent the bandwheel 6, see FIG. 3, while the second hinge member 24 is spaced outwardly therefrom. The hinge members permit pivoting of carrier arm 20 about an axis 32 which is generally parallel to the axes of rotation of bandwheels 4 and 6. This allows vertical movement of the second arbour 16.

There is an elastomeric member 34 compressibly received between the carrier arm and the support 30 of frame 2 which has sufficient rigidity to support the carrier arm. Such elastomeric members are commonly called "rubber springs". While the selection of the rubber spring would be dictated by the characteristics of the particular bandmill, a typical example would be an Aeon (TM) type 0325/55 two core rubber spring. Member 34 is vertically aligned with arbor 16 as best seen in FIG. 2 and is adjacent the first hinge member 22, see FIG. 3. Member 34 rests upon a plate 36, and a hydraulic cylinder 38 is positioned between the plate 36 and base 30 and carries said plate and the elastomeric member. A hydraulic line 40 connects cylinder 38 to a pressure gauge 42 which indicates the pressure of fluid within cylinder 38.

A relatively large plunger 44 extends vertically downwards from base 30 and is slidably received within an upper bushing 46 and a lower bushing 48 carried by frame 2. Similarly, a guide rod 50 extending downwardly from base 30 is slidably received by a bushing 52 on frame 2. The base 30 is supported by a first screw-type jack 54 which is mounted on frame 2 and can be raised or lowered by means of an electric motor 56. Jack 54 is therefore capable of raising or lowering arbor 16 to increase or decrease the distance between the bandwheels 4 and 6 to tighten the bandsaw 8 and to accommodate saws of varying lengths.

Arbors 14 and 16 act as cantilevers for bandwheels 4 and 6 since the arbors are supported by frame 2 and project laterally therefrom and the bandwheels are mounted on the projecting portions of these arbors. The carrier arm 20 is on the same side of the frame as the arbors. In order to properly align the bandsaw 8, there is a mechanism for tilting the carrier arm 20 transversely of the frame and thereby the second bandwheel 6. While the first hinge member 22 is directly mounted on a support 58 on base 30, the second hinge member 24 is supported by a rod 60 slidably received by a bushing 62 on the base. Rod 60 is mounted on the second screw-type jack 64 which is bolted to the bottom of base 30. Jack 64 is operated by a hand wheel 66 and is capable of raising or lowering hinge member 24 relative to hinge member 22. This provides a means for laterally tilting the carrier arm 20 and consequently the second bandwheel 6 to align the bandsaw 8 when necessary.

A vertical bolt 68 is connected to the base 30 by means of a pair of nuts 70 and 72. Bolt 68 passes slidably through an aperture 74 in carrier arm 20 and a pair of nuts 76 on the bolt limit the maximum upward movement of the carrier arm.

The first jack 54 can simultaneously raise or lower base 30, the elastomeric member 34, the hinge members 22 and 24, the carrier arm 20 and the second arbor 16. It is therefore used to adjust the distance between the bandwheels for installation of the bandsaw and to provide the initial tension for the bandsaw. On the other hand, the second jack 64 is used to tilt carrier arm 20 and arbor 16 for proper alignment of the bandsaw as mentioned above. During operation of the bandmill 1, the elastomeric member or rubber spring 34 permits variations in the distance between the bandwheels 4 and 6 caused by stretching of bandsaw 8 during cutting. The strain value placed on the bandsaw by jack 54 and member 34 is indicated by fluid pressure gauge 42 by reading the pressure of fluid within cylinder 38. The gauge indicates the tensile force on the saw blade. As an alternative, an electronic strain gauge with a digital readout can be used in association with the upper arbor.

By using an elastomeric member or rubber spring 34 in place of air springs and other types of strain systems according to the prior art, several distinct advantages are obtained:

(1) As opposed to the use of an air spring, the present elastomeric member requires no force of pressurized fluid so it is less complicated and is not subject to failure resulting from a fluid leak. Since the stroke of cylinder 38 is relatively small, jack 54 can easily accommodate the difference in strain should a leak develop.

(2) Rubber springs are inherently more rugged than air springs and it is feasible to provide a rubber spring which can handle the entire strain of the bandmill. The hinges members 22 and 24 are therefore not required to carry a significant portion of the strain such as found in U.S. Pat. No. 3,838,620 to Baldrey. The design of these members is therefore simplified.

(3) Rubber springs provide a degree of self-damping not found with mechanisms using air springs or metallic springs. Hydraulic systems provide damping, but this damping could vary due to lack of maintenance or contamination of the hydraulic fluid. Similarly, systems employing a series of Belleville springs would provide some energy absorption due to friction between the springs, but the friction would decrease with velocity instead of increasing with velocity as does an ideal damper.

(4) In the area of quality control, some differences in spring rate and damping properties of rubber springs will be found due to differences in the durometer hardness between individual springs, due to temperature changes and age. However, these effects are generally much less than for fluid systems where the spring rate and damping properties vary because of poor installation, contamination of fluid, seizure of parts, leaks and temperature changes.

(5) Given the same spring rate and spring stroke, the envelope of a rubber spring is significantly smaller than practically achievable with coil springs or Belleville springs. The spring rate of a rubber spring can easily be adjusted by varying the durometer hardness of the rubber.

(6) Unlike metallic springs, rubber springs are not susceptible to corrosion which can affect the durability and spring rate. Fretting corrosion can be a problem with Belleville springs due to small motions between the discs.

(7) Horizontal displacement caused by pivoting of the carrier arm 20 will cause the elastomeric member 34 to shear slightly. No pivoting or sliding mechanism is therefore required on the spring support.

(8) Elastomeric members or rubber springs are practically maintenance free.

Besides bandmills of the type described above, similar rubber springs or elastomeric members can be used on other types of bandmills and provide similar advantages. For example, rubber springs can be used in place of the air spring in the bandmill disclosed in U.S. Pat. No. 3,905,266. They can also be used on mills where the arbors extend from both sides of the bandwheels. In this case there are carrier arms on both sides of the top bandwheel and an elastomeric member supports each carrier arm. The other elements described above for the carrier arm are provided for each of the carrier arms of this alternative.

What is claimed is:

1. A bandmill having a frame, first and second bandwheels for receiving and guiding a bandsaw, the bandwheels being rotatably about spaced-apart, generally parallel axes of rotation, first and second arbors for the first and second bandwheels respectively, means mounting the first arbor on the frame against movement towards and away from the second arbor, means mounting the second arbor on the frame for limited movement towards and away from the first arbor, and a strain mechanism for the bandsaw comprising a bearing member including a carrier arm for the second arbor and a resilient strain source comprising solely an elastomeric member compressibly received between the carrier arm and the frame and having sufficient rigidity to support the carrier arm and any load applied thereto during operation of the bandmill.

2. A bandmill as claimed in claim 1, the carrier arm being mounted on top of the elastomeric member, the elastomeric member being supported from below by the frame.

3. A bandmill as claimed in claim 2, the strain mechanism comprising a first jack for raising or lowering the elastomeric member.

4. A bandmill as claimed in claim 3, the carrier arm being pivotable about an axis parallel to said axes of rotation, permitting vertical movement of the second arbor.

5. A bandmill as claimed in claim 4, the elastomeric member being vertically aligned with the second arbor.

6. A bandmill as claimed in claim 3, comprising a base for the elastomeric member supported by the first jack.

7. A bandmill as claimed in claim 6 comprising means for transversely tilting the carrier arm and the second bandwheel to align the bandsaw.

8. A bandmill as claimed in claim 7 comprising two pivotal connections between said carrier arm and the base to provide the pivoting about said parallel axis, a first said pivotal connection being generally adjacent the second bandwheel and a second said pivotal connection being spaced outwardly therefrom.

9. A bandmill as claimed in claim 8, the means for transverse tilting comprising a second jack mounted on the base and supporting the second said pivotal connection.

10. A bandmill as claimed in claim 9, the bandwheels being cantilevered by the arbors, the arbors extending from one side of the bandwheels and the carrier arm being on said one side.

11. A bandmill as claimed in claim 6, the base having a plunger vertically slidable within the frame, the first jack comprising a screw-type jack for raising and lowering the base.

12. A bandmill as claimed in claim 9, the second jack comprising a screw-type jack.

13. A bandmill as claimed in claim 9, the elastomeric member being generally adjacent the second bandwheel, the second jack being spaced outwardly therefrom.

14. A bandmill as claimed in claim 13, the elastomeric member being generally adjacent the first pivotal connection and the second jack being generally adjacent the second pivotal connection.

15. A bandmill as claimed in claim 1 comprising a fluid cylinder between the frame and the elastomeric member and supporting said elastomeric member.

16. A bandmill as claimed in claim 15 comprising a fluid pressure gauge connected to the fluid cylinder for indicating the pressure of fluid therein and thereby the strain placed on the bandsaw by the strain mechansim.

* * * * *